No. 784,607. PATENTED MAR. 14, 1905.
R. H. WHITE.
TRANSMISSION MECHANISM FOR AUTOMOBILES.
APPLICATION FILED APR. 7, 1904.

3 SHEETS—SHEET 2.

Witnesses.
E. B. Gilchrist
B. W. Brockett

Inventor.
Rollin H. White,
By his Attorneys,
Thurston & Bates

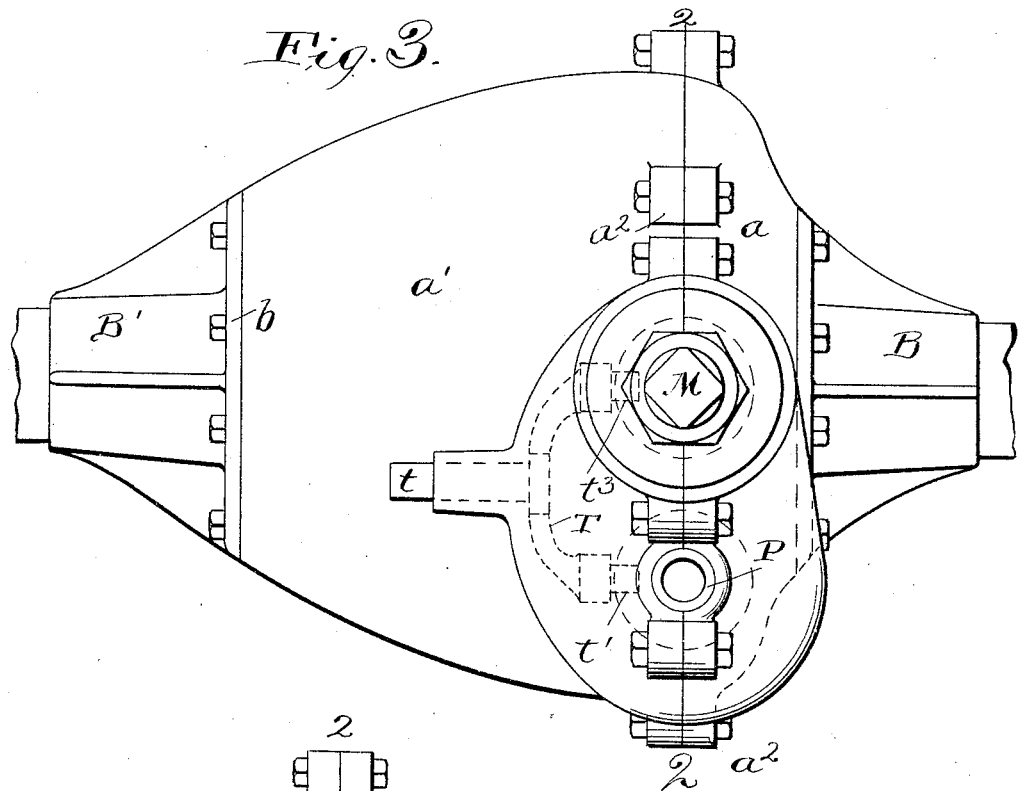
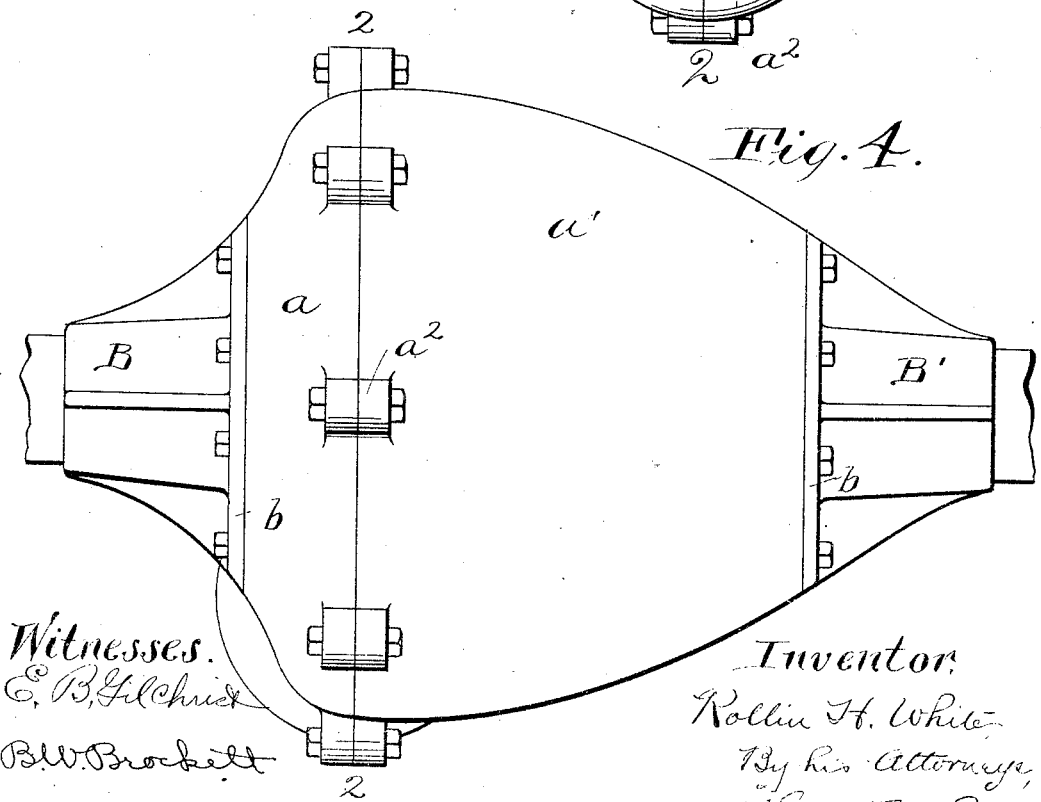

No. 784,607.                                                    Patented March 14, 1905.

UNITED STATES PATENT OFFICE.

ROLLIN H. WHITE, OF CLEVELAND, OHIO, ASSIGNOR TO THE WHITE SEWING MACHINE COMPANY, OF CLEVELAND, OHIO, A CORPORATION OF OHIO.

TRANSMISSION MECHANISM FOR AUTOMOBILES.

SPECIFICATION forming part of Letters Patent No. 784,607, dated March 14, 1905.

Application filed April 7, 1904. Serial No. 202,002.

*To all whom it may concern:*

Be it known that I, ROLLIN H. WHITE, a citizen of the United States, residing at Cleveland, in the county of Cuyahoga and State of Ohio, have invented a certain new and useful Improvement in Transmission Mechanism for Automobiles, of which the following is a full, clear, and exact description, reference being had to the accompanying drawings.

This invention is an improvement in the kind of mechanism which is employed on automobiles to transmit automatically-differentiated motion from a longitudinally-disposed driving-shaft to the axle-sections, which are connected with the driving-wheels. It is a compact and simple combination of change-speed gearing, differential gearing, and clutch mechanism; and the invention resides in the combinations of parts of which said mechanisms are composed and by which they are caused to act coöperatively, together with the means for mounting, adjusting, and protecting them, all of which will appear from the following description and claims, read in conjunction with the accompanying drawings, of which—

Figure 1:
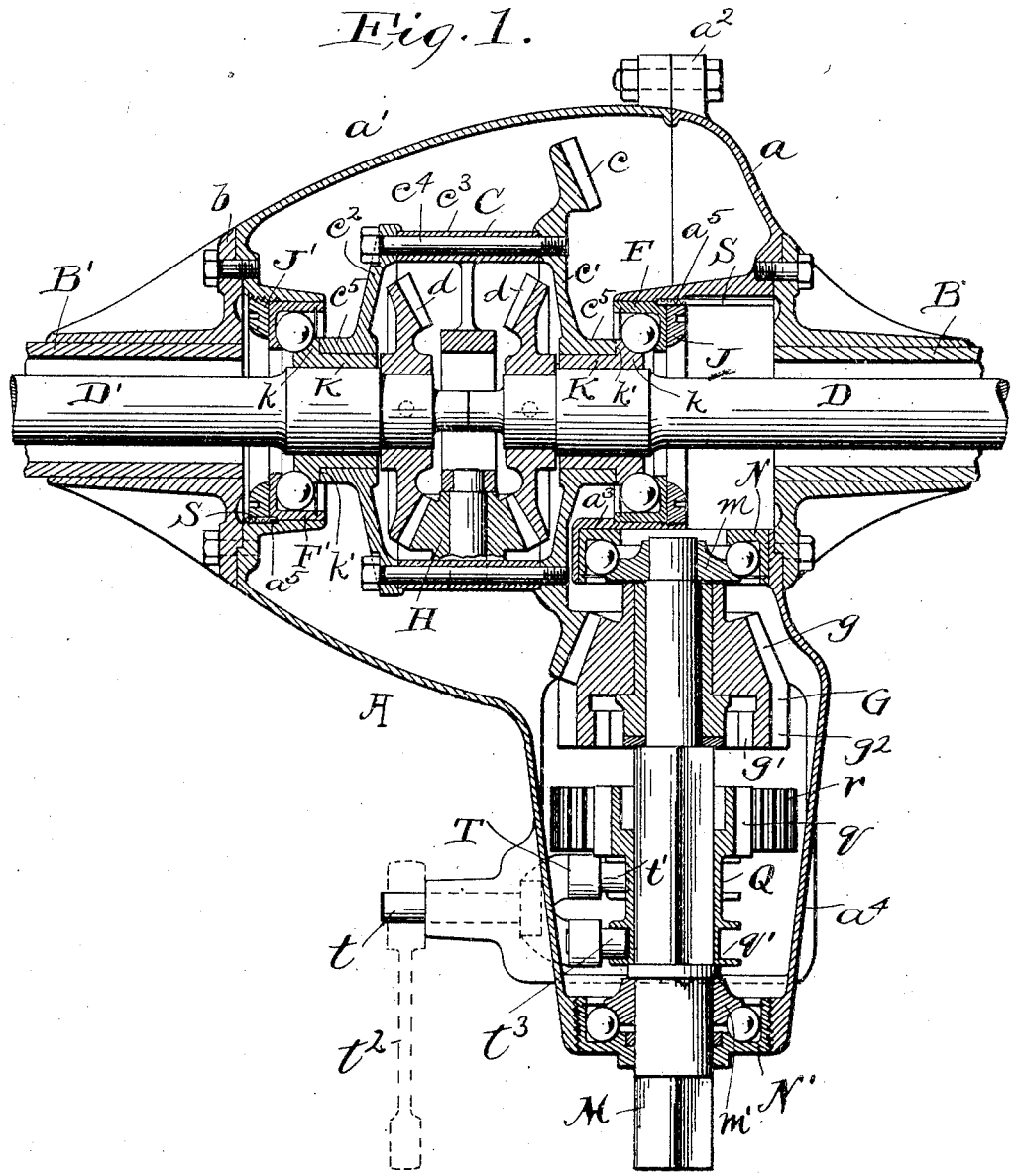
Figure 2:
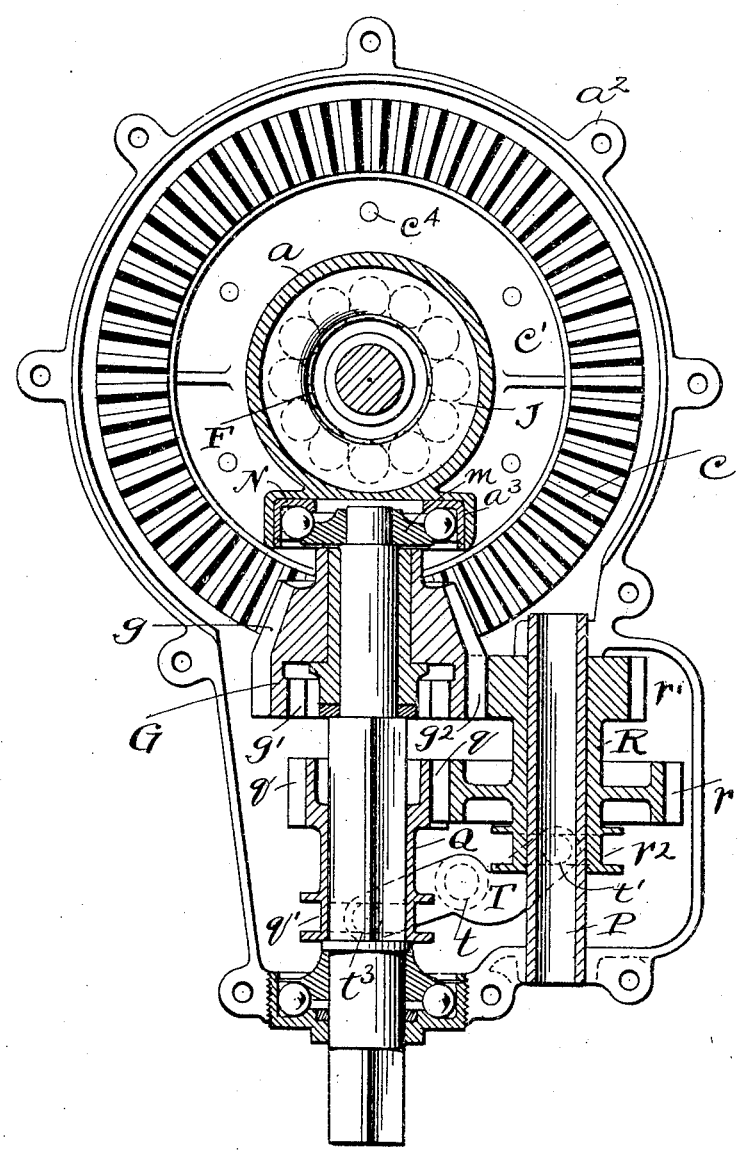

Figure 1 is a central sectional plan view of the mechanism embodying the invention. Fig. 2 is a vertical sectional side elevation, the section being in the plane indicated by line 2 2 on Fig. 3. Fig. 3 is a front elevation, and Fig. 4 is a rear elevation, of the casing and such parts as appear when the casing is closed.

Referring to the parts by letters, A represents a casing in which the differential mechanism, the clutch, and the change-speed gearing are inclosed and mounted. This casing is made of the casing-sections $a$ $a'$, which are separable in a vertical plane at right angles to the axis of the axle-sections, in which plane the axis of the driving-shaft lies. These casing-sections are provided with flange-like ears $a^2$, through which pass the bolts by which the casing-sections are secured together. Two laterally-extended tubes B B', having flanges $b$ at their inner ends, are firmly secured, as by machine-screws, to the open outer ends of the casing-sections, respectively. When so secured, these tubes are, in effect, a part of the casing, although in order to make the description clearer the word "casing" will be employed herein to indicate only the structure made up of the two sections $a$ $a'$.

The axle-sections D D', which extend through the tube B into the casing, are rotated at automatically-differentiated speeds by differential gearing which is generically of familiar form and is axially mounted with respect to said axle-sections. Said axle-sections pass through the ends of the differential drum C, which is a part of said differential gearing. On the inner ends of the axle-sections the bevel-gears $d$ $d$ are secured, and they mesh with planetary gears H, which are mounted on said drum. These axle-sections and drum rotate in unison so long as the axle-sections are rotating at the same speed, and they are supported in ball-bearings, the cups F F' of which are fitted into cylindrical openings in the ends of the casing-sections and may be adjusted therein by means of the adjusting-rings J J', which screw into the casing-sections. The cones $k$ of these ball-bearings are on the outer ends of sleeves K, which are fitted upon the axle-sections and into axial cylindrical holes in the hubs $c^3$ of the differential drum. Each of these sleeves K may be fast to the corresponding axle-section and rotatable within the hub of the drum, or it may be fast to the hub of the drum and rotatable upon the axle-section, or it may be rotatable independently of both the axle-section and drum. I prefer that this sleeve shall be fast to the axle-section and rotatable within the hub of the drum. The ends of the hub of the drum will lie between and will engage with the shoulders $k'$, which are formed upon this sleeve by the enlarged cones $k$, wherefore the endwise movement of this drum is impossible when said bearings have been properly adjusted. This drum carries a beveled gear $c$, which meshes with the beveled gear-teeth $g$ on the gear G, which is loosely mounted on the driving-shaft M. This drum, as shown, is made of two heads $c'$ $c^2$ and an intermediate cylinder $c^3$, which parts are connected by bolts $c^4$. The bevel-gear $c$ is formed on the outer edge of the head $c'$.

The driving-shaft M, whose axis is at right angles to the axis of the axle-sections, extends into the casing through an opening in the front part $a^4$ thereof. Two cones $m$ $m'$ are fixed to this driving-shaft, and they coöperate with two cups N N' to form raceways for the balls of the ball-bearing for said shaft. One of these cups, N, is seated in a recess $a^3$, carried by the casing member $a$. The other cup, N', screws into the open front end of the forwardly-projecting part $a^4$ of said casing.

The gear G is peculiar in that it has three sets of gear-teeth—viz., the bevel-gear teeth $g$, with which the bevel-gear $c$ engages, the internal gear-teeth $g'$, which are formed in that end thereof which is remote from the gear $c$, and the external gear-teeth $g^2$. On the driving-shaft M is a longitudinally-movable sleeve Q, on which is a gear $q$, which is adapted to mesh with the internal gear $g'$. This sleeve is slidable lengthwise upon the shaft, but must rotate therewith, this result being attained, preferably, by making this part of the shaft square. When this gear does mesh with the internal gear-teeth $g'$, it serves to clutch the gear G and the driving-shaft together, wherefore they must rotate in unison.

In the forwardly-projecting part $a^4$ of the casing is secured a non-rotating shaft P, which is parallel with the driving-shaft. A sleeve R is slidably mounted upon this shaft, and it carries two gears $r$ $r'$ of different diameters, one of which is adapted to mesh with the gear $q$ and the other with the external gear-teeth $g^2$ on the gear G. The sleeve R has an annular groove $r^2$, which receives a pin $t'$, fast to a rocking lever T. This lever is in the casing and is secured to a short rock-shaft $t$, whose outer end projects through the casing, and is provided on its outer end with an arm $t^2$, by which it may be rocked. The sleeve Q has also an annular groove $q'$, and this receives another pin $t^3$, attached to the opposite arm of this same rocking lever T. By rocking this rock-shaft these two sleeves are caused to move in opposite directions. If sleeve Q is, for example, in such position that the gear $q$ is engaging with the internal gear $g'$, thereby clutching together the gear G and the driving-shaft, the first effect of rocking the rock-shaft is to withdraw the gear $q$, and thereby disconnect gear G from the driving-shaft, and this happens before the gears $r$ $r'$ are caused to mesh with the other gears. When the parts are in this position, the rotation of the driving-shaft has no effect whatever upon the gear G, and consequently no effect whatever upon the axle-sections. A still further movement of this sleeve Q, which is of course accompanied by an equal movement in the opposite direction of the sleeve R, causes the gear $r$ to mesh with the gear $q$ and the gear $r'$ to mesh with external gear-teeth $g^2$, whereby motion is transmitted from the driving-shaft to sleeve R and thence to gear G, but at slow speed.

It will be understood by those familiar with this art that the tubes B B are to be secured, through springs, to the vehicle-frame, and that the outer ends of the axle-sections are secured to the driving-wheels, and that either said wheels are mounted on the outer ends of said tubes, or that the outer ends of the axle-sections are mounted in the outer ends of said tubes.

In order to open the casing to get at the inclosed parts for any purpose, one or both of the tubes must be disconnected from the vehicle-frame. Then one may separate the two casing-sections or may separate either tube from the casing. When this latter separation is effected, the position of the ball-bearing cups F F' may be adjusted by turning the rings J J'. When the desired adjustment has been secured, the further turning of either ring may be prevented by a pin S, which lies in a recess made partly in the casing and partly in the ring J. The ring has a number of these notches, one of which may be brought opposite to the single notch $a^5$. The pin is prevented from coming out by the end of the tube B, which when secured to the casing contacts with the end of said pin.

Having described my invention, I claim—

1. In transmission mechanism especially adapted for automobiles, the combination of two alined axle-sections, an axially-mounted differential mechanism for driving them, which differential mechanism has an external gear by which it is driven, with a driving-gear meshing with said external gear and having external gear-teeth additional to those which mesh with said external gear, a driving-shaft mounted axially with respect to said driving-gear and rotatable independently thereof, a clutch for connecting said driving gear and shaft, a clutch-operating sleeve movable lengthwise only on said driving-shaft and having external gear-teeth, a rotatable sleeve which is longitudinally movable in a path parallel with the driving-shaft, said sleeve having two external gears adapted respectively to mesh with the external teeth on the driving-gear and with the external gear on said sliding sleeve, and means for moving said two sleeves longitudinally, substantially as specified.

2. In transmission mechanism especially adapted for automobiles, the combination with the rotatable differential gear having an external gear by which it may be rotated, of a driving-shaft, an axially-mounted and independently-rotatable gear G having teeth for meshing with the gear on the differential mechanism, and having internal teeth in that end which is remote from the differential mechanism, and having also external teeth, with a sleeve movable longitudinally only upon the driving-shaft and having a gear adapted to mesh with the internal gear-teeth above mentioned, a rotatable sleeve which is longitudinally movable in a path parallel with the driving-shaft, said sleeve having two gears which are respectively adapted to mesh with the external teeth on the gear G and with the gear on the sleeve slidable upon the driving-shaft, and means for moving said two sleeves longitudinally, substantially as specified.

3. In transmission mechanism especially adapted for automobiles, the combination with the rotatable differential gearing having an external gear by which it may be rotated, of a driving-shaft, an axially-mounted and independently-rotatable gear G having teeth for meshing with the gear on the differential mechanism, and having internal teeth in that end which is remote from the differential mechanism, and having also external teeth, with a sleeve movable longitudinally only upon the driving-shaft and having a gear adapted to mesh with the internal gear-teeth above mentioned, a rotatable sleeve which is longitudinally movable in a path parallel with the driving-shaft, said sleeve having two gears which are respectively adapted to mesh with the external teeth on the gear G and with the gear on the sleeve slidable upon the driving-shaft, and means for moving said two sleeves reciprocally, substantially as described.

4. In transmission mechanism especially adapted for automobiles, the combination with the rotatable differential gearing having an external gear by which it may be rotated, of a driving-shaft, an axially-mounted and independently-rotatable gear G having teeth for meshing with the gear on the differential mechanism and having internal teeth in that end which is remote from the differential mechanism and having also external teeth with a sleeve movable longitudinally only upon the driving-shaft, and having a gear adapted to mesh with the internal gear-teeth above mentioned, a rotatable sleeve which is longitudinally movable in a path parallel with the driving-shaft, said sleeve having two gears which are respectively adapted to mesh with the external teeth on the gear G and with the gear on the sleeve slidable upon the driving-shaft, each of said longitudinally-movable sleeves having an annular groove, a rocker having projections entering said grooves, and means for rocking said rocker, substantially as described.

5. In transmission mechanism especially adapted for automobiles, the combination with the rotatable differential gearing having an external gear by which it may be rotated, of a driving-shaft, an axially-mounted and independently-rotatable gear G having teeth for meshing with the gear on the differential mechanism, and having internal teeth in that end which is remote from the differential mechanism, and having also external teeth, with a sleeve movable longitudinally only upon the driving-shaft and having a gear adapted to mesh with the internal gear-teeth above mentioned, a rotatable sleeve which is longitudinally movable in a path parallel with the driving-shaft, said sleeve having two gears which are respectively adapted to mesh with the external teeth on the gear G and with the gear on the sleeve slidable upon the driving-shaft, each of said longitudinally-movable sleeves having an annular groove, a casing in which all of said parts are inclosed and mounted, a rock-shaft passing through the casing-wall, an operating-arm secured to the outer end of said rock-shaft, and a rocker secured near its middle to its inner end and having projections at opposite ends which enter the annular grooves in said sleeves, substantially as specified.

6. In transmission mechanism especially adapted for automobiles, the combination of a driving-shaft, a gear G independently rotatable upon the same axis having external gear-teeth and internal gear-teeth, a sleeve movable lengthwise only on said driving-shaft having an annular groove and a gear adapted to mesh with said internal gear-teeth, a sleeve slidable lengthwise on a parallel axis and having two gears of different diameters and an annular groove, a rocking lever having projections on opposite arms which engage with said two annular grooves respectively, and means for rocking said rocker, substantially as specified.

7. In transmission mechanism especially adapted for automobiles, the combination of a casing composed of two transversely-separable parts, two axle-sections entering opposite ends of said casing, antifriction-bearings in the casing for supporting the inner ends of said axle-sections, differential gearing rotatable about the axis of said axle-sections for transmitting automatically-differentiated motion to them, said differential gearing having an external gear by which it may be rotated, with a driving-shaft entering said casing, adjustable antifriction-bearings in said casing for supporting said driving-shaft, a gear independently rotatable upon said driving-shaft in mesh with the gear on said differential mechanism, means preventing the endwise movement of said independently-rotatable gear, a clutch by which said gear may be made fast to said driving-shaft, and clutch-operating mechanism extending through the wall of the casing and operable from the outside thereof, substantially as specified.

8. In transmission mechanism especially adapted for automobiles, the combination of a casing composed of two transversely-separable parts, two axle-sections entering opposite ends of said casing, antifriction-bearings in the casing for supporting the inner ends of said axle-sections, differential gearing rotatable about the axis of said axle-sections for transmitting automatically-differentiated motion to them, said differential gearing having an external gear by which it may be rotated, with a driving-shaft entering said casing, adjustable antifriction-bearings in said casing for supporting said driving-shaft, a gear G independently rotatable upon said driving-shaft in mesh with the gear on said differential mechanism, means preventing the endwise movement of said independently-rotatable gear, said gear having external gear-teeth additional to those which mesh with said external gear, and having also internal gear-teeth in the end which is remote from said external gear, a sleeve carrying a gear located within the casing and movable lengthwise only upon said driving-shaft, a non-rotatable shaft in said casing parallel with the driving-shaft, a sleeve slidable lengthwise thereon and having two gears, and means passing through the casing-wall and operable from outside of the casing for imparting reciprocal endwise motion to said two sleeves, substantially as specified.

9. In transmission mechanism especially adapted for automobiles, the combination of a gear-casing formed of two transversely-separable sections, having cylindrical openings in its ends, bearing-cups movably fitted in said opening, adjustable rings which screw into said openings against said cups, and laterally-extended tubes which are removably secured to the ends of the casing over said openings, with axle-sections entering said casing through said tubes, sleeves within the casing embracing said axle-sections and having cones which coöperate with said cups to form ball-raceways, and having also external annular shoulders facing toward each other, a differential drum which embraces said sleeve and lies between and in contact with said shoulders, said drum and axle-sections being relatively rotatable, gears secured to the axle-sections within said drum, planetary gears, and means for rotating said drum, substantially as specified.

10. In transmission mechanism especially adapted for automobiles, the combination of a gear-casing, formed of two transversely-separable sections, having cylindrical openings in its ends, bearing-cups movably fitted in said opening, adjustable rings which screw into said openings against said cups, and laterally-extended tubes which are removably secured to the ends of the casing over said openings, with axle-sections entering said casing through said tubes, sleeves embracing said axle-sections and having cones which coöperate with said cups to form ball-raceways and having also external annular shoulders facing toward each other, a differential drum which embraces said sleeve and lies between and in contact with said shoulders, said drum and axle-sections being relatively rotatable, gears secured to the axle-sections within said drum, planetary gears mounted on said drum in mesh with said axle-section gears, a cup supported in a recess in a part of one of said casing-sections with its axis at right angles to the axis of the axle-sections, a driving-shaft entering the front end of said casing, a cone secured to its inner end for coöperating with said cup to form a ball-raceway, another cone fixed to said driving-shaft within said casing, and a cup screwing into the opening in said casing through which said driving-shaft passes and which coöperates with the last-named cone to form a raceway, a gear independently rotatable upon said driving-shaft for driving said drum, and a clutch for connecting and disconnecting said gear and driving-shaft, substantially as specified.

In testimony whereof I hereunto affix my signature in the presence of two subscribing witnesses.

ROLLIN H. WHITE.

Witnesses:
E. B. GILCHRIST,
E. L. THURSTON.